Patented June 27, 1933

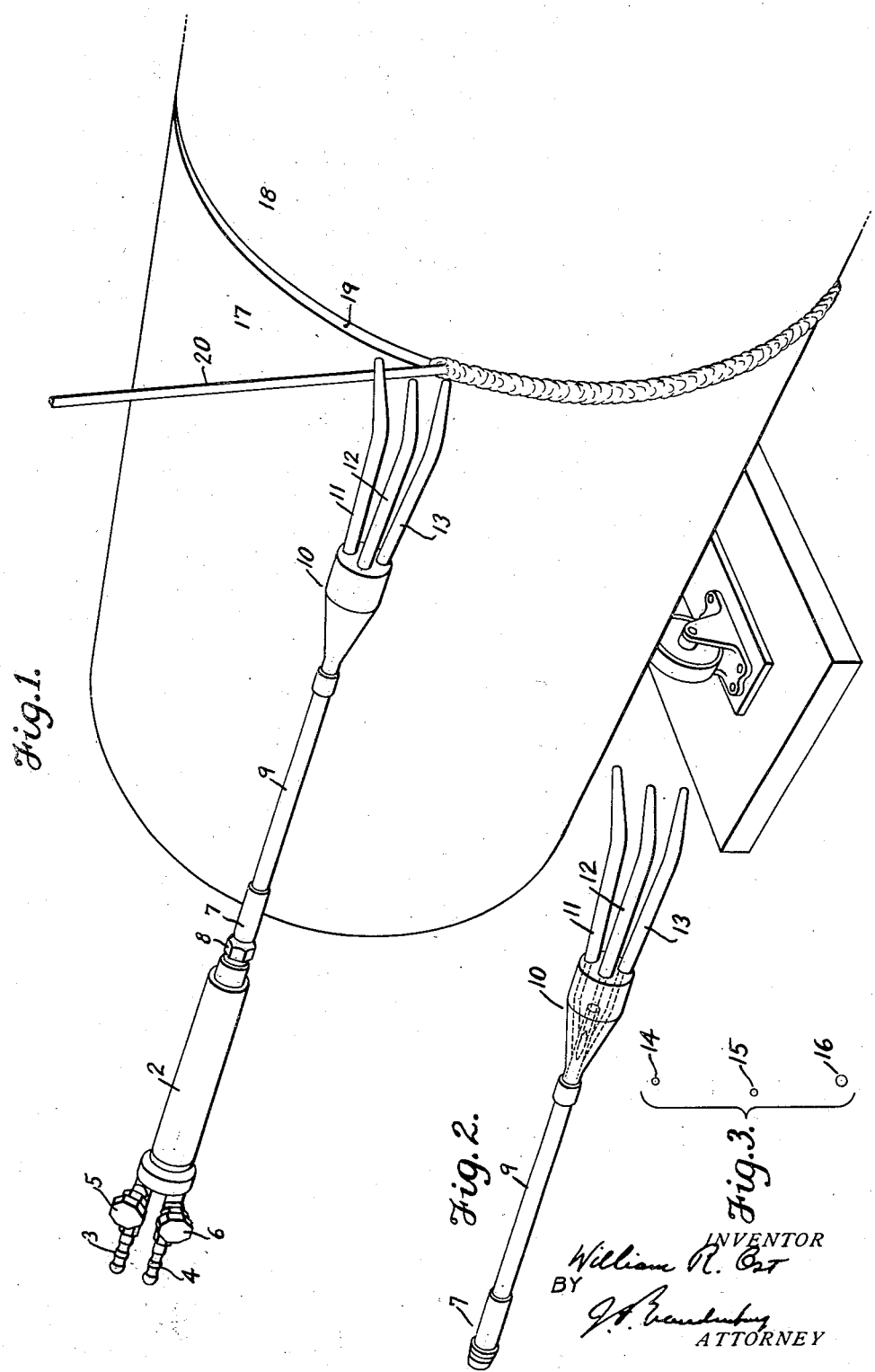

1,915,946

UNITED STATES PATENT OFFICE

WILLIAM R. OST, OF VERONA, NEW JERSEY, ASSIGNOR TO AIR REDUCTION COMPANY, INCORPORATED, OF NEW YORK, N. Y., A CORPORATION OF NEW YORK

WELDING APPARATUS

Application filed March 11, 1930. Serial No. 434,987.

This invention comprises a novel torch apparatus for welding steel or other metal in the form of plate, pipe, etc. The torch in the form illustrated herein is adapted for welding with special advantage the circumferential seams between the ends of pipe lengths, but the invention is not limited to this application.

The object is to provide a simple apparatus for making good welds rapidly, easily and economically.

More specifically, the object is to enable a hand welder to make welds faster and more economically than they can be made with a single flame tip.

The herein described embodiment of the invention has provisions for delivering a main welding flame, a relatively small advance flame to preheat the plate metal, and another relatively small flame to preheat the welding rod; these functions being performed simultaneously by distinct but cooperative agencies combined in a single torch.

The form of the apparatus may be varied, but it preferably consists of a torch or an attachment for a torch having three, or a plurality of long, separated, flexible tips, the ends of which are spaced approximately in line. One of these tips may be regarded as a main welding tip and the other two as preheating tips. The torch is used in connection with a welding rod for filling in the seam or adding metal at the welded joint. A rod is thus used in the welding of edges which have been beveled to form a V. In making such a weld, one tip serves to preheat the base metal, that is to say the regions to be fused and united, another tip serves principally to preheat the welding rod though it may also preheat the base metal, and the third tip produces the weld.

In some cases two tips would be sufficient, and on the other hand a greater number than three might be employed. The provision for changing the relative spacing, directions and alinement of the tips by making part or all of them flexible is a feature of the invention.

Other features of the invention can best be brought out in connection with the description of the preferred form of the apparatus.

In the accompanying drawing forming part hereof:

Fig. 1 is a perspective view illustrating a circumferential welding operation being performed with a preferred form of torch embodying the invention;

Fig. 2 is a view of the device shown in Fig. 1 with extension tube and mixer detached from the body of the torch; and Fig. 3 is a schematic view illustrating spacing and arrangement of the orifices of the tips, such spacing and arrangement, however, being variable.

2 is the handle of a conventional hand welding torch, containing the usual conduits for leading the oxygen and acetylene to the point where they are mixed or combined in the proper proportions. The hose connections forming the rear extremities of these conduits are marked 3 and 4, respectively, and 5 and 6 are the usual control valves.

The mixer 7 is preferably, though not necessarily, applied removably to the handle, by means of a nut 8. The mixer may be of any kind suitable for an oxyacetylene torch, and as the designs of such mixers are known it is thought unnecessary to illustrate its internal arrangements. A straight extension tube 9 is shown, extending forward from the mixer, this tube conducting the mixed gases to a distributer 10. Extending forward from this distributer are three slender, curved tips 11, 12 and 13 of considerable length, the general effect being that of a long handled fork. The tips are screwed, preferably removably, into the distributer or are otherwise firmly united thereto, and the distributer, in turn, is wholly supported from the body of the torch. The tips are of soft copper, so that they can be readily bent.

The tips 11 and 12 serve principally for preheating, and their orifices 14 and 15 may be and preferably are considerably smaller than the orifice 16 of the tip 13, which, in this instance, is the main welding tip. However, the relative sizes of the orifices may vary depending on the character of the work to be done. While the orifices are approximately in line, it will be noted that the intermediate tip 12 is so bent that its orifice is slightly, but definitely to one side of the line, that is to say, at the side toward the handle of the torch. It will also be observed that this tip is a little shorter than the others, or that its extremity does not project down so far as the extremity of the tip 11 for example. The reasons for these features will appear.

The method and manner of making the weld will now be described. The operation illustrated is the welding together of the ends of two pipe lengths or sections, that being a field for which the invention is very desirable.

Two pipe sections are designated 17 and 18. Their abutting end edges have been beveled to form the customary V 19, and it may be understood that the sections have been tack welded together at three or more points, and that the extreme edges are not in actual abutment but are sufficiently spaced to allow them to come together or approximately together as the welding proceeds.

The torch tips and the weld rod 20 are held in the approximate positions illustrated in Fig. 1. By virtue of the common distributer, tube and handle the several tips are manipulated as a unit.

The weld may be started by fusing the sides of the V, bringing the end of the weld rod close to fusion and introducing its end beneath the surface of the puddle, where it is kept throughout the making of the weld, the metal from the rod being added from beneath, in accordance with standard hand welding practice.

As the operation progresses along the line of the V, the operator may constantly oscillate the tips and the weld rod crosswise of the weld, moving the tips, or at least the tip 11, and the rod, in reverse directions, in curved lines. The purpose of the lateral motion is to enable the jets to heat the metal at the sides of the V properly and to enable the jet delivered by the main tip 13 to fuse the sides of the V from the top, where they are comparatively widely spaced, to the bottom, also to prevent the rod from being just melted or deposited in the V but to secure uniform interfusion, and by the stirring action of the rod to bring oxide to the surface. However, the technique may naturally be varied.

As the tips and the weld rod are thus moved along the line of the V, or conversely as the work is moved relatively to the torch (which might be done, though the regular practice is to turn the pipe from time to time), the jet from the tip 11 performs an important duty in heating up the base metal. The jet from the tip 12 adds more heat to the base metal, and a very valuable purpose which it serves is to preheat the weld rod above the point where the rod enters the puddle. This alone effects a great economy in time and gas consumption, since it enables the rod to be fed into the weld much faster than would otherwise be possible. It also permits larger weld rods to be used.

The jet delivered from the tip 13 does the final work of fusing the metal of the parts to be united and of incorporating therewith the added metal melted from the rod, to form the weld.

The spacing of the extremities of the tips is a matter of moment, as is also the length and separation of the tips; so that the independence of the flames is preserved; so that the weld rod can be properly introduced; and so that a clear view is preserved. The distances at which the orifices are spaced apart are very considerable, on the order, preferably, of about an inch, more or less. It is necessary, however, to vary the spacing for different thicknesses of material and for different diameters of pipe, and it is also desirable to be able to vary their relative alinement, their relative approach to the work, and the relative inclinations at which the jets are delivered, so that each jet will put heat into the metal where it will do the most good. For these reasons the flexibility of the tips enabling them to be bent is highly desirable.

The disposition of the orifice of the tip 12 to one side of the general line is for the purpose of applying heat most effectively to the exposed part of the welding rod before it enters the puddle, and the fact that the end of this tip is somewhat high up enables it to clear the rod as the criss-cross motions are executed.

The orifice of the main welding tip 13 is preferably smaller than the orifice of a single torch tip that would be used for the same thickness of metal, and the orifices of the tips 11 and 12 may be and preferably are considerably smaller still.

Whereas the tip 12 is designed to clear the welding rod, the tip 11 is extended far enough to strike, or to be struck by the side of the rod as the tips and the rod are oscillated in their motions. This has a utility, since it affords a check which keeps the operator from making an unnecessarily wide weld, which welders often do at present either from selfish motives or from lack of care. A weld too wide does not add to the strength, and it does use up more gas and weld rod and takes more time.

Returning to the general aspect of the invention, and for purpose or comparison directing our attention to the usual and welding operation, it will be observed that there are four rather distinct steps involved, viz.:—

(1) Preheating the base metal,
(2) Preheating the welding rod (to some extent),
(3) Fusing the base metal, and (4) Melting the rod into the puddle bounded by the molten base metal.

All of these steps are accomplished with a single flame in hand welding as it has been practised for many years, and the operation has been slow and comparatively costly. The marked advantage obtainable by my method is due to the fact that the necessary steps are performed simultaneously by means of separate flames.

The practical importance of the ability to modify in any degree the dispositions of these flames delivered from a single torch can not be overestimated. It is possible not only to vary the spacing lengthwise of the seam within wide limits, but also to change the alinement (or non-alinement), the distance of the flames from or their proximity to the work, and their inclinations in any desired directions. Such adjustments are necessarily relative and there is a relation ascertainable for any given undertaking which will give the best results.

My invention, therefore, preheats the base metal, preheats the rod and produces the weld, and because of these functions being performed concurrently by separate flames the following results are obtained (as compared with single flame tip operation):

The time necessary to make good welds can be greatly reduced.

The gas consumption can be reduced even more.

The ratio of acetylene necessary to add one pound of welding rod can be much reduced.

The amount of weld rod required is also reduced, and thicker weld rods can be employed.

Good welds can be made to smaller dimensions than are possible with a single flame.

I realize that my invention is susceptible of modification and of other applications in welding, and that important advantages can be realized even though the invention may not be utilized in its entirety. It's not absolutely necessary, for example, that all of the tips be flexib'e. Furthermore, it will be apparent that the functions of the tips shown may be performed by a larger number of tips in proper grouping. Consequently, when a function is ascribed to a tip it is to be understood that such function need not necessarily be performed by an individual jet delivered from one tip or orifice. I do not wish, therefore, to limit myself to the precise form of apparatus which has been described.

I claim:

1. A welding torch device comprising three long separated tips the ends of which are spaced approximately in line, two of the tips being preheating tips having orifices smaller than the orifice of the third tip, and the tips being flexible for the purpose of varying the spacings and dispositions of the flame jets.

2. A hand welding torch device comprising a plurality of long separated tips the ends of which are spaced approximately in line, certain of said tips being preheating tips having orifices smaller than the orifice of another tip which constitutes the main welding tip, said tips being flexible to provide for adjustment of the spacing of the orifices.

3. An oxyacetylene hand welding torch device comprising a plurality of long separated tips the ends of which are spaced approximately in line, and means for supplying the oxyacetylene mixture to all of said tips, one of said tips being a work-preheating tip of sufficient length to act as a stop in connection with a weld rod, another tip being a welding tip, and an intermediate tip being adapted to clear the weld rod and preheat the same.

4. A hand welding torch having means for conducting and mixing the oxygen and acetylene gases, a forwardly extending tube for conducting the mixture, a distributer on the forward end of said tube, and a plurality of separated, bent, flexible tips extending from said distributer and adapted to deliver a series of independent flames, one of said tips adapted to preheat base metal, another adapted to preheat a welding rod, and another adapted to fuse metal from the welding rod and produce the weld.

5. An oxyacetylene hand welding torch for welding seams between plate metal parts with addition of metal from a welding rod, said torch having a plurality of slender, separated tips adapted to deliver a series of independent flames, one of said tips adapted to preheat the plate metal, another adapted to preheat the welding rod and another adapted to produce the weld, and means for supplying all of said tips with the oxyacetylene mixture, the rod-preheating tip being intermediate the plate-preheating tip and the welding tip.

6. An oxyacetylene hand welding torch for welding seams between plate metal parts with addition of metal from a welding rod, said torch having a plurality of slender, separated tips adapted to deliver a series of independent flames, one of said tips adapted to preheat the plate metal, another adapted to preheat the welding rod and another adapted to produce the weld, and means for supplying all of said tips with the oxyacetylene mixture, said tips being flexible for the purpose of being bent to adjust the relations of the separate flames.

7. An oxyacetylene welding torch for welding seams between plate metal parts with addition of metal from a welding rod into the V between the beveled edges of the parts, said torch having provisions for delivering a main welding flame, a relatively small advance flame to preheat the sides of the V and another relatively small flame arranged to preheat the welding rod, said flames being distinct, and common means for supplying the three flames with the oxyacetylene mixture.

8. An oxyacetylene welding torch for welding seams between plate metal parts with addition of metal from a welding rod into the V between the beveled edges of the parts, said torch having means for conducting and mixing the oxygen and acetylene, a distributer, and three separated tips extending from the distributer, said tips comprising a main welding tip, a forward tip having a relatively small orifice to apply a preheating flame to the sides of the V, and a third small orifice tip spaced from the others and disposed to play a preheating flame on the welding rod higher up than the welding flame and not interfering therewith.

9. An oxyacetylene welding torch for welding seams between plate metal parts with addition of metal from a welding rod into the V between the beveled edges of the parts, said torch having oxygen and acetylene conduits, a mixer, and three separated tips all supplied from said mixer, said tips comprising a main welding tip adapted to deliver its flame at the region where the rod metal is fused into the V, a forward tip adapted to apply a preheating flame to the sides of the V without melting them, and a third tip disposed to play a non-fusing preheating flame on the welding rod at a region above the welding flame.

10. An oxyacetylene welding torch for welding seams between plate metal parts with addition of metal from a welding rod into the V between the beveled edges of the parts, said torch having means for delivering there separate and distinct flames, namely means for applying a welding flame at the region where the rod metal is fused into the V, means for applying a non-fusing preheating flame to the sides of the V much in advance of the welding flame, and means for applying a non-fusing preheating flame to the welding rod at a region above the welding flame.

11. An oxyacetylene welding torch for welding seams between plate metal parts, with addition of metal from a welding rod into the V between the beveled edges of the parts, said torch having a tip part comprising a plurality of jet portions, the orifices of which are distant from each other and directed at different inclinations, one of said jet portions having an orifice adapted to direct a main welding flame at the puddle in the V at the lower end of the welding rod, another portion having its orifice arranged to deliver a flame much in advance of the welding flame, to preheat the sides of the V, and a third portion having its orifice in such relation to the others that its flame preheats the welding rod above the V, and means for supplying all three flames with the oxyacetylene mixture.

WILLIAM R. OST.